May 6, 1952     D. R. STEWART     2,595,373
ELECTRICAL ENERGY MEASURING APPARATUS
Filed Sept. 11, 1947
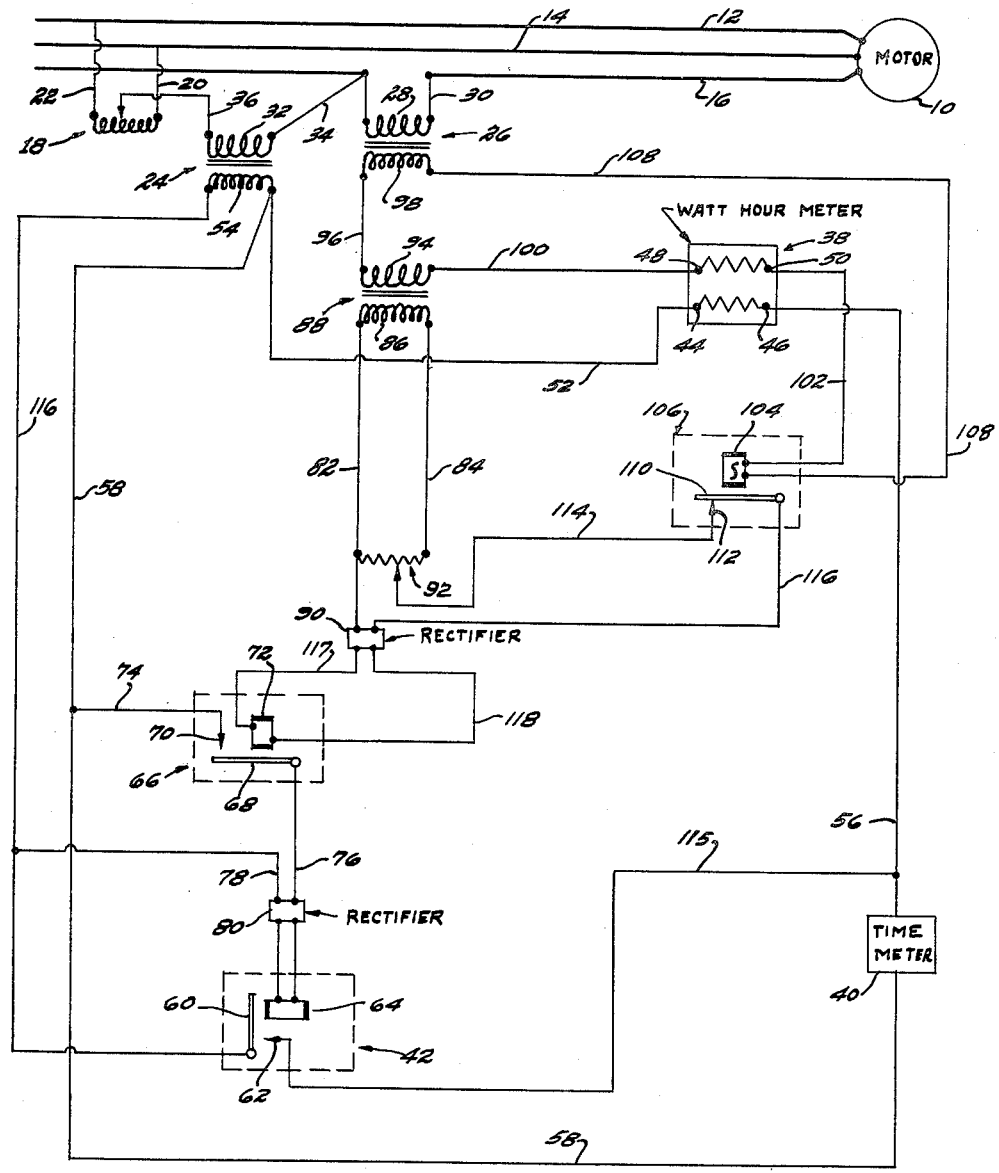
INVENTOR.
DONALD R. STEWART.
BY
Wallace P. Lamb
ATTORNEY.

Patented May 6, 1952

2,595,373

UNITED STATES PATENT OFFICE 2,595,373

ELECTRICAL ENERGY MEASURING APPARATUS

Donald R. Stewart, Detroit, Mich.

Application September 11, 1947, Serial No. 773,329

10 Claims. (Cl. 171—34)

This invention relates generally to electrical apparatus and more particularly to electrical metering or recording apparatus.

The present application is a continuation-in-part of my pending application Serial No. 590,930, filed April 28, 1945, now abandoned.

In industry it is essential to measure the amount of work necessary by men and machines to produce the products of industry. The most product for the least work is the goal. Work is by far the greatest element of cost in the finished product and is the object of efficient processing. If we measure the work necessary for a given amount of output, we can determine our losses and decrease them for optimum efficiency by using the best suited tools, cutting oils, materials, feeds and speeds, etc. On hand operated machines, such as a drill press, grinder, etc., it can be seen that the operator's work during the productive time is in directing the machine to do work; and that the operator's work is directly proportional to the machine's work. It can be seen that the necessary work in a machine operation is furnished by the motor driving the machine, and if we measure the time and energy consumed by the driving motor or motors during the productive time only, we have an accurate measure of the amount of work and the rate of doing such work. There are known systems of measuring total time and energy such as the strip chart meters, which shows the various load conditions and when they occur; but they do not measure productive time and energy only and they do not measure integrated time and energy. Other systems are on the market for the purpose of demand metering, where it is advisable to know how much energy, time or both the electric energy consumed exceeded a predetermined amount. This type of metering is used for billing or invoicing purposes, and it is not necessary to have the sensitivity necessary to differentiate between free load and light loads found to exist on individual motors; neither are they concerned with not registering starting loads, also due to the fact that they do not require sensitivity, they do not need sensitivity protection.

Accordingly, it is an object of the present invention to eliminate the above mentioned problems.

More specifically, it is the object of the invention to provide an electrical apparatus or system which will accurately, automatically, and unquestionably show the work and/or time necessary to produce goods on any particular machine to which it is connected by measuring and recording the productive time and energy input to the motor driving the machine only during the time it is producing useful work. The data so obtained can be used in the analysis of time study or machine and tool performance or both as the case requires.

Another object of the invention is to provide metering or recording apparatus for the above mentioned purpose which is entirely automatic in response to operation of the machine yet records only the electrical energy employed in doing useful work.

Another object of the invention is to provide an automatically operable energy recording system which is sensitively responsive to the initial, smallest positive increment of applied load on the electric motor during an operation and will again respond when the load is reduced to this value. The initial response initiates the measurement and the following response terminates the measurement.

Another object of the invention is to provide an energy recording system having provisions to insure against recording of the energy and/or time consumed in starting the motor.

Another object of the invention is to provide an improved arrangement of an automatically and sensitively operable energy recording system to insure against damage to a sensitive control of the system.

Another object of the invention is to provide an automatic means of measuring the total time out of an elapsed time that the machine is producing useful work.

Other objects of the invention will become apparent from the following detail description taken in connection with the accompanying drawing in which:

The figure is a diagrammatic view of the metering and recording system in circuit with the driving motor of a machine.

Referring to the drawing by characters of reference, a machine (not shown) may be driven by a suitable electric motor 10 which, in the present instance, is illustrated as a three-phase motor connected to a suitable source of power by main lead wires 12, 14 and 16. In industrial plants, a high voltage, such as 440 v., is usually employed and where voltage reduction is required for secondary circuits, as in the present instance, an auto transformer 18 may be used. The transformer 18 is connected by suitable lead wires 20, 22 respectively to the main leads 12 and 14. Two additional transformers 24 and 26 which may be termed the potential transformer and current transformer respectively are employed, in the present system, but it will be understood that the number of transformers employed and the manner in which they are connected in the circuit depends, among other things, upon the type of electric motor used on a machine and upon the magnitude of the main line voltage. The transformer 26 has a primary coil 28 connected by a lead wire 30 to the main lead wire 16 and the other transformer 24 has a primary coil 32 having one terminal connected by a lead wire 34 to a terminal of the transformer 26 or to the main line 16. The other terminal of the transformer primary coil 32 is connected to a suitable terminal of the auto transformer 18 by a lead wire 36.

The recording means comprises, an energy or watt hour meter 38 and an electrically operated timer 40. Controlling operation of these devices 38 and 40 is a sensitive control or relay 42. The watt hour meter 38, timer 40 and the relay 42 are in parallel in a potential circuit of the system. The meter has a pair of potential contacts 44 and 46 and a pair of current circuit contacts 48 and 50. A lead line 52 connects the watt hour meter potential contact 44 to one terminal of a secondary coil 54 of the transformer 24 and a lead wire 56 connects the other potential contact 46 of the meter 38 to a terminal of the electrically operated timer 40 which is connected by a lead wire 58 to the same side of the transformer secondary coil 54. Relay 42 has a normally open, movable contact 60, a cooperable, fixed contact 62 and coil 64. Upon energization of the relay 42, the following circuit is closed; from the transformer secondary coil 54 through lead line 52, meter contacts 44, 46, lead line 56, 58 through lead line 115, closed relay contacts 60, 62 back through lead line 116 to the other side of the transformer secondary coil 54. Thus, when the above potential circuit is closed, the watt hour meter 38 and the timer 40 are energized and act to record energy and time respectively.

In order to provide a recording system which is responsive to slight changes in working load on the motor 10, I provide a second control or relay 66 which is arranged to control operation of the potential circuit controlling relay 42. This second relay 66 is more sensitive in operation than the potential circuit controlling relay 42; the relay 66 being made to respond to slight changes in the current.

The relay 66 comprises, in general, a movable contact 68, a cooperating fixed contact 70 and a coil 72. A lead line 74 connects the fixed contact 70 of relay 66 to the potential circuit lead line 58 and a lead line 76 connects the movable contact 68 of relay 66 to one end of the coil 64 of the relay 42, through rectifier 80. The other end of the relay coil 64 is connected by a lead wire 78 to the potential circuit lead line 116. Thus, when the sensitive relay contacts 68 and 70 are closed the following circuit is closed causing relay 42 to be energized: From one side of the transformer secondary 54 through closed relay contacts 70 and 68, lead wire 76, relay coil 64, lead wire 78 and lead wire 116 back to the other side of the transformer secondary coil 54. In the lead lines 76, 78, I provide a rectifier 80 to eliminate the effect of alternating current on the sensitive relay 66 which otherwise would respond to the changing current.

The coil 72 of the relay 66 is connected by lead wires 117 and 118. Lead wire 117 is connected through rectifier 90 and lead wire 82 to one side of the secondary coil 86. Lead wire 118 is connected through rectifier 90 and lead wire 116 to the movable contact 110 of safety control relay 106. The fixed contact 112 of normally closed relay 106 is connected by lead wire 114 to the potentiometer 92 which is connected across lead lines 82 and 84 which are connected to opposite ends of a transformer secondary coil 86 of a fourth transformer 88. Potentiometer 92 is adjustable to regulate the current flowing to the sensitive coil 72 of the relay 66 so that the relay contacts 68, 70 are open on free running load of the motor 10 and close immediately upon the smallest increment of load being placed on motor 10. The transformer 88 has one end of its primary coil, as at 94, connected by a lead wire 96 to one terminal or side of the secondary coil 98 of the transformer 26. A lead wire 100 connects the other end of the transformer primary coil 94 to the terminal 48 of the watt hour meter 38. The other current terminal 50 of the watt hour meter 38 is connected by a lead line 102 to a coil 104 of a safety control or relay 106; the other end of the relay coil being connected to a terminal of the transformer secondary 98 by a lead wire 108. The safety relay 106 includes, a movable contact 110 and a cooperating, fixed contact 112. These contacts 110, 112 are normally in engagement, as shown. A lead wire 114 connects the relay fixed contact 112 to the lead wire 84 of the transformer secondary coil 86 and a lead wire 116 connects the relay movable contact 110 to the coil 72 of the sensitive relay 66.

It will now be seen that as long as the safety control contacts 110, 112 remain in contact, the sensitive relay 66 may be energized and act to close the circuit of the potential line relay control 42. However, when excessive currents exist, such as occurs when the motor 10 is started, the relay coil 104 will be energized and break contacts 110, 112, opening the circuit of the sensitive relay 66. Thus, the safety relay 106 acts to prevent excessive current flow to the sensitive relay 66 to prevent damage to the latter. Also, the safety relay 106, by breaking the circuit of the sensitive relay 66 prevents recording of the motor starting energy which otherwise would constitute an inaccuracy in the meter reading, since it is desired to record only the energy input to the motor 10 during the application of a work load on the motor. When the starting load on the motor 10 returns to the normal range of operating load, the safety relay closes contacts 110 and 112 after which the sensitive relay is responsive to loads applied to the motor 10. Upon application of a load on motor 10, above free running load of the motor, the sensitive relay 66 responds immediately energizing the relay 42 which acts immediately to close the potential circuit of the meter 38 and timer 40. These devices then operate to record the energy used and the time period of use of the energy so long as the load on the motor 10 remains greater than free running or idling load of the motor. Upon removal of the load on the motor 10, the sensitively responsive relay 66 breaks circuit to the less sensitive relay 42 which in turn opens the potential circuit stopping further recording of the watt hour meter 38 and the timer 40.

From the foregoing description, it will be noted that I have provided a practical, impartial, accurate and automatic recording system for recording energy input to an electric motor in terms of useful work, which is sensitive in response to the smallest increment of applied load on the motor so that the system will accurately record the productive energy and/or time only over a wide range of operation.

It will be noted that the arrangement or elements used to obtain this high degree of sensitivity is a means of sensitive control. Other means might be used so long as the degree of sensitivity is such that it will respond to the smallest increment of load change on the motor in doing useful work.

Although a preferred form of the invention has been illustrated and described in detail, it will be apparent to those skilled in the art that various modifications may be made therein without departing from the spirit of the invention or from the scope of the appended claims.

I claim:

1. In a system for recording the productive work of a machine driven by an electric motor, an energy recording means operable to record the electrical energy used by the motor, an electrically operated control means operable to control operation of the energy recording means, and a second electrically operated control means sensitive in response to increase in load on the motor above free running load thereof controlling operation of said first control.

2. In a system for recording the productive work of a machine driven by an electric motor, a watt hour meter for recording energy used by the motor, a relay operable to control operation of said watt hour meter, and a second relay sensitive relative to and controlling operation of said first relay, said second relay being responsive to slight changes in load on said motor.

3. In a system for recording the productive work of a machine driven by an electric motor, an energy recording means operable to record the electrical energy used by the motor, an electrically operated control means operable to control operation of the energy recording means, a second and relatively sensitive electrically operable control means operable in response to increase in load on the motor above free running load thereof to control operation of said first control means, and a third control means responsive to a predetermined further increase in load on the motor operable to make said second-named control means inoperable.

4. In a system for recording the productive work output of a machine driven by an electric motor, the combination of a watt hour meter, a relay in and controlling the potential circuit of the watt hour meter, a second relay in the potential circuit of the meter controlling operation of the first relay, said second relay being connected to the current circuit of said meter, and a safety relay in the current circuit of said meter controlling operation of said second relay.

5. In a system for recording the productive work output of a machine driven by an electric motor, a watt hour meter having potential and current circuits for operative connection with the motor, a relay operable to control the potential circuit of said meter, a second relay in the current circuit of said meter operable to control operation of said first relay, said second-named relay being sensitive to slight increase in load on the motor above free running load thereof to actuate said first relay, a potentiometer in circuit with said second relay to adjust current flow thereto and a rectifier in circuit with said second relay.

6. In a system for recording the productive work output of a machine driven by an electric motor, an auto transformer, a potential circuit transformer connected to the auto transformer, a current circuit transformer connected to the second transformer, a watt hour meter having potential terminals connected to the secondary of the potential circuit transformer, an electrically operated timer in the potential circuit, a relay controlling the potential circuit, a second current circuit transformer in circuit with current terminals of said watt hour meter, a current circuit relay connected to the secondary of the second current circuit transformer controlling operation of the first relay, a rectifier in circuit with one of said relays between said second relay and said second current transformer secondary, a potentiometer in circuit with and between said rectifier and said current transformer secondary, and a safety relay in the current circuit of the watt hour meter controlling operation of said second-named relay.

7. In a system for recording the productive work input of a machine driven by an electric motor, an energy recording means operable to record the electrical energy used by the motor, and an electrically operated control means sensitively responsive to the smallest increment of applied load on the electric motor to control operation of the energy recording means.

8. An electrical metering apparatus for determining the productive output of an electric motor comprising, an electrical energy meter having a closed current circuit and a potential circuit, control means in the closed current circuit responsive to predetermined change of load on the motor to control the potential circuit of said meter, and means in the closed current circuit for determining the operation of said control means.

9. In an electrical apparatus for recording the productive work input of an electric motor, an electrically operated recording means for connection in a potential circuit with the electric motor, a relay controlling the circuit of the electrically operated recording means and connected in a current circuit for connection to the electric motor, and a potentiometer in the current circuit adjustable to regulate operation of the relay in accordance with the free running load of the electric motor.

10. An electrical apparatus for recording only the productive output of an electric motor comprising, an electrical energy recording meter connected to the motor having a current circuit and having a potential circuit, a relay in the current circuit controlling the potential circuit of the electrical energy recording meter, and a potentiometer in the current circuit adjustable for varying the current supplied to the relay to regulate operation of the relay at the free running load of the electric motor.

DONALD R. STEWART.

REFERENCES CITED

The following references are of record in the file of this patent:

UNITED STATES PATENTS

| Number | Name | Date |
|---|---|---|
| 1,163,226 | Evans et al. | Dec. 7, 1915 |
| 1,284,231 | Burke | Nov. 12, 1918 |
| 1,346,100 | Grower | July 6, 1920 |
| 2,072,812 | Galt | Mar. 2, 1937 |
| 2,372,134 | Steeb | Mar. 20, 1945 |

FOREIGN PATENTS

| Number | Country | Date |
|---|---|---|
| 703,517 | Germany | Mar. 11, 1941 |